(12) United States Patent
Kristiansen (10) Patent No.: US 11,084,374 B2
(45) Date of Patent: Aug. 10, 2021

(54) MODULAR VEHICLE CONCEPT

(71) Applicant: Jesper Flindt Kristiansen, Greve (DK)

(72) Inventor: Jesper Flindt Kristiansen, Greve (DK)

(\*) Notice: Subject to any disclaimer, the term of this patent is extended or adjusted under 35 U.S.C. 154(b) by 276 days.

(21) Appl. No.: 16/315,512

(22) PCT Filed: Jul. 4, 2017

(86) PCT No.: PCT/DK2017/050223
§ 371 (c)(1),
(2) Date: Jan. 4, 2019

(87) PCT Pub. No.: WO2018/006916
PCT Pub. Date: Jan. 11, 2018

(65) Prior Publication Data
US 2019/0241067 A1    Aug. 8, 2019

(30) Foreign Application Priority Data

Jul. 6, 2016  (DK) .............................. PA201670505

(51) Int. Cl.
*B60P 1/00*     (2006.01)
*B60K 17/356*   (2006.01)
*B60K 7/00*     (2006.01)

(52) U.S. Cl.
CPC .......... *B60K 17/356* (2013.01); *B60K 7/0007* (2013.01); *B60P 1/00* (2013.01); *B60Y 2200/62* (2013.01)

(58) Field of Classification Search
CPC ...... B60K 17/356; B60K 7/0007; B60K 1/00; B60P 1/00; B60Y 2200/62; B62D 63/02; B66F 9/06; G06Q 10/00

USPC ........................................................ 180/243
See application file for complete search history.

(56) References Cited

U.S. PATENT DOCUMENTS

| 4,496,274 A | 1/1985 | Pipes |
| 6,059,058 A | 5/2000 | Dower |
| 2008/0017426 A1* | 1/2008 | Walters .................. F41H 7/044 180/89.1 |

(Continued)

FOREIGN PATENT DOCUMENTS

| DE | 10 2012 102 648 A1 | 9/2012 |
| DE | 102013016381 A1 | 4/2015 |

(Continued)

*Primary Examiner* — Tony H Winner
*Assistant Examiner* — Felicia L. Brittman
(74) *Attorney, Agent, or Firm* — Condo Roccia Koptiw LLP (57) ABSTRACT

Described is a modular transport unit adapted for transporting persons and/or goods and comprising at least one cabin module and/or at least one storage compartment module, and at least one autonomous propulsion module. The autonomous propulsion module may be adapted for simultaneously serving as a flexible, customizable undercarriage of said modular transport unit and, in operation, propelling said modular transport unit. The propulsion module may comprise a propulsion system, a suspension unit, and a housing. The housing may comprise a top cover element comprising at least one connection element adapted for connection with at least one complementary connection element provided on the cabin module and/or the storage compartment module to enable an end user to exchange the cabin module and/or the storage compartment module.

17 Claims, 6 Drawing Sheets

(56) References Cited

U.S. PATENT DOCUMENTS

| | | |
|---|---|---|
| 2010/0116572 A1 | 5/2010 | Schmitt et al. |
| 2011/0109052 A1* | 5/2011 | Hatzikakidis ........... B60L 50/71 280/5.5 |
| 2012/0034055 A1 | 2/2012 | Leonard |
| 2014/0012228 A1 | 1/2014 | Jabba et al. |
| 2014/0119862 A1 | 5/2014 | Terry |
| 2015/0083509 A1 | 3/2015 | Borroni-Bird et al. |
| 2015/0125252 A1 | 5/2015 | Berzen Ratzel |
| 2015/0027795 A1 | 6/2015 | Hirai et al. |
| 2016/0209847 A1 | 7/2016 | Kuegle |

FOREIGN PATENT DOCUMENTS

| | | |
|---|---|---|
| DE | 202014000755 U1 | 5/2015 |
| EP | 0014176 A1 | 8/1980 |
| EP | 0102706 A1 | 3/1984 |
| EP | 2818349 A1 | 12/2014 |
| FR | 1 522 417 | 4/1968 |
| WO | WO 01/14239 A1 | 3/2001 |
| WO | WO 2012/117204 A1 | 9/2012 |

* cited by examiner

MODULAR VEHICLE CONCEPT

CROSS REFERENCE TO RELATED APPLICATIONS

This application is the National Stage Entry under 35 U.S.C. § 371 of Patent Cooperation Treaty Application No. PCT/DK2017/050223, filed 4 Jul. 2017, which claims priority from Denmark Patent Application No. PA 2016 70505, filed 6 Jul. 2016, the contents of which are hereby incorporated by reference herein.

TECHNICAL FIELD

The present invention generally relates to the concept of offering "transport as a service" (TAAS). The present invention more particularly relates to a modular transport unit, and in particular a modular vehicle, comprising at least one cabin module adapted for accommodating and transporting persons and/or at least one storage compartment module adapted for accommodating and transporting goods, and at least one autonomous propulsion module.

BACKGROUND ART

Vehicles and transport units, irrespective of the type, are traditionally produced and purchased as a complete final and fixed unit without offering any significant flexibility in the design or construction. The traditional production of all types of vehicles and transport units only fits needs up to a certain extend and is most often also an expensive asset.

However, the transporting needs and desires of the end-user, whether a private person or a public or private transportation company, change all the time, giving rise to the general desire of more flexibility in the construction and adaptability of vehicles and transport units, especially after purchase. Some attempts to meet this desire have been made.

FR 1 522 417 A for instance describes a modular undercarriage with modules, which may be combined taking into account the load capacity needed. The modules comprise wheel modules, shock absorber modules, breaking modules and steering modules. FR 1 522 417 A does not describe cabin modules or storage compartment modules.

Likewise US 2014/0012228 A1 describes modular bodyworks that by means of different modules may be adapted to the needs of the driver or buyer.

Furthermore, DE 10 2012 102 648 A1 describes modular bodyworks of industrial transport systems for heavy duty mounting- and logistics processes, these systems being for use within the premises an industrial plant, and may by means of different modules be adapted to the needs prevailing within the industrial plants.

These solutions are, however, quite complex and in particular complicated to customize and adapt, and therefore do not work well in a world with ever changing needs for transport capacity, whether of load or passengers. Furthermore, the known solutions require a large number of components and are therefore expensive both in procurement costs and storage costs. Also, the known solutions are not readily adaptable to modern energy sources such as electricity or hydrogen. Finally, the known solutions are not suitable for applications in which vehicles are shared between several users.

SUMMARY OF THE INVENTION

In light of the above it is therefore an object of the invention to develop and provide a universal transport solution, meeting transport needs in real time for every occasion. Particularly, it is an object of the invention to provide a modular transport unit allowing an end user, irrespective of his professional skill, to exchange the cabin and/or the storage compartment as well as to customize both the number of propulsion modules and of cabin modules and/or of storage compartment modules according to need arising from given circumstances such as to provide an increased degree of flexibility to the end user. Furthermore, it is an object of the invention to provide a modular transport unit which may be customized and adapted using few components and thus being cheaper both in procurement costs and storage costs. Other objects include providing a modular transport unit being readily adaptable to any modern energy source, such as electricity or hydrogen, batteries, solar, magnetic levitation, electromagnetism, compressed air, biomass, gas, water or fuel rods, and providing a modular transport unit being suitable for applications in which vehicles are shared between several users. Still other objects, aims and advantages of the invention will become apparent from the following description, claims and drawings.

These and other objects are solved by means of a modular transport unit adapted for transporting persons and/or goods and comprising at least one cabin module adapted for accommodating and transporting persons and/or at least one storage compartment module adapted for accommodating and transporting goods, and at least one autonomous propulsion module as well as the features of the characterizing part of claim 1.

Particularly, the distinctive part of the invention is that the propulsion module comprises a frame element, a suspension unit being attached to the frame element and comprising a plurality of shock absorbing membranes with mutually different diameters, the shock absorbing membranes being arranged on top of one another or nested within one another, at least one propulsion element, at least one bearing, preferably a ball bearing, the propulsion element being coupled to the at least one bearing in such a way that the propulsion element is free to rotate about at least one axis of rotation, preferably a plurality of axes of rotation, and the bearing being attached to the frame element at a side opposite to the suspension unit, a motor and an energy source for delivering energy to the motor, thrust system being adapted and arranged to convert energy from the motor and transmitting converted energy to the at least one propulsion element to enable propulsion of the modular transport unit, and a housing, the housing comprising a top cover element comprising at least one connection element adapted for connection with at least one complementary connection element provided on the at least one cabin module and/or at least one complementary connection element provided on the at least one storage compartment module in such a way as to enable an end user to connect and/or disconnect the at least one cabin module and/or the at least one storage compartment module to/from the at least one autonomous propulsion module, such that the at least one autonomous propulsion module is adapted for simultaneously serving as a flexible, customizable undercarriage of the modular transport unit and, in operation, propelling the modular transport unit, and that the modular transport unit is any one of a car, a van, a truck, a bus, a train, a train wagon, a tram and a tram car.

By providing the propulsion module with a housing, the housing comprising a top cover element comprising at least one connection element adapted for connection with at least one complementary connection element provided on the at least one cabin module and/or at least one complementary connection element provided on the at least one storage compartment module in such a way as to enable an end user to connect and/or disconnect the at least one cabin module and/or the at least one storage compartment module to/from the at least one autonomous propulsion module, a modular transport unit is obtained which allows an end user to exchange of the cabin and/or of the storage compartment as well as to customize the number of propulsion modules in a very simple and straight-forward manner. Thus the end user need not have any particular professional skills.

Furthermore, the end user may customize the cabin and/or the storage compartment, and thus the modular transport unit, according to need arising from given circumstances such as to provide an increased degree of flexibility to the end user. This in turn provides for a modular transport unit being suitable for applications in which vehicles are shared between several users.

Furthermore, by providing the propulsion module with components as described above enabling it to propel the modular transport unit as well as with a suspension unit and the connection elements as also described above, and thereby adapting the at least one autonomous propulsion module for simultaneously serving as a flexible, customizable undercarriage of the modular transport unit and, in operation, propelling the modular transport unit, a modular transport unit is provided which comprises only very few components and which may therefore be customized and adapted using few components and thus being cheaper both in procurement costs and storage costs. Thereby a modular transport unit being readily adaptable to modern energy sources, such as electricity or hydrogen, and furthermore being particularly suitable for applications in which vehicles are shared between several users, is provided for. Also, a modular transport unit with propulsion modules that may be arranged in any feasible or desired or needed formation or cluster is provided for, thus providing optimum flexibility when customizing the undercarriage of to modular transport unit.

Such a modular transport unit thus supports mounting and autonomous replacement of any suitable self-designed and/or self-produced cabin or equivalent need. For instance, the end user may design his own cabin and/or storage compartment modules, and he or she may build the modules themselves, or have them built elsewhere. For instance the cabin and/or storage compartment modules may be 3D printed in e.g. environmentally degradable materials.

Given the flexibility and construction of the propulsion module, and especially the fact that the motor and energy source forms part of the propulsion element rather than being arranged in a separate engine compartment as in traditional vehicles, investments and costs operating the new transport units will lower pricing, increase recycling, increase independency, support green energy propellants and support vehicle sharing on a new level. For instance, the average traditional car is only in active use about 5% of the time. With a modular transport unit according to the invention, on the other hand, the cabin module(s) and/or storage compartment module(s) may easily and quickly be exchanged such that a cabin module and/or storage compartment module for one particular purpose may be left behind, e.g. standing in a garage, while a cabin module and/or storage compartment module for another particular purpose may be mounted on the propulsion module(s) and be in active use. Thus, a modular transport unit according to the invention may be in active use for a way larger percentage of time.

Furthermore, the construction of the propulsion module in terms of being provided with a frame and a suspension unit as described above, provides for a very high load capacity—in fact up to several tons—as well as a very high degree of robustness.

Furthermore, the flexibility and construction of the propulsion module, especially when also provided with a processor unit as described further below, provides for a modular transport unit which may easily be adapted for driver-less applications.

Thus, a universal transport solution, meeting transport needs in real time for every occasion is hereby provided for.

In an embodiment the at least one connection element and the at least one complementary connection element are any one or more of safety locks, magnetic latches and electrical latches.

Thereby a connection element and a complementary connection element is provided which are very robust and which provide for a very sturdy and stable coupling, thus enabling meeting safety requirements, but at the same time very simple to couple together and decouple from one another, thus allowing the end-user to exchange the cabin and/or storage compartment module(s) in a simple and straight forward manner without the need for professional aid from e.g. a mechanic or the like.

In an embodiment the at least one connection element and the at least one complementary connection element are controlled by manual or autonomous action.

This in particular allows the end-user to exchange the cabin and/or storage compartment module(s) in a simple and straight forward manner without the need for professional aid from e.g. a mechanic or the like.

In an embodiment the propulsion module further comprises a brake unit adapted for reducing the propulsion speed.

In an embodiment the propulsion module further comprises a processor unit adapted for controlling any one or more of the motor, the energy source, the first thrust shaft, the second thrust shaft, the brake unit and the propulsion elements. Thereby a modular transport unit is provided which may be configured to be partly or fully autonomously driven. In other words such a modular transport unit may be configured to be driver-less.

In an embodiment the propulsion module further comprises at least one shield element, the propulsion element and the bearing being arranged in the shield element, and the shield element being attached to the frame element at a side opposite to the suspension unit. Thereby, the propulsion elements are shielded towards both the remaining components of the propulsion modules and, at least partly, towards the surroundings such as to avoid impurities from interfering with the propulsion elements, thus achieving a longer lifetime and improved functioning of the propulsion elements.

In an embodiment the propulsion module further comprises a further shock absorbing membrane and a lower frame part forming part of the frame element, the further shock absorbing membrane being arranged between the lower frame part and the remaining frame element. Thereby further shock absorption, especially of vibrations and shocks inflicted on the propulsion elements, are absorbed partly or fully to provide an even smoother ride.

In an embodiment the propulsion module further comprises a compartment adapted for accommodating the energy source, the compartment preferably comprising a cover element. Thereby, the energy source is kept separated from both other components of the propulsion module and from the surroundings, such as to minimize external influences on the energy source and thus optimize its efficiency.

In an embodiment the modular transport unit further comprises at least one sensor element, such as a radar, a lidar, a camera, a gyroscope, an antenna, a laser based sensor element, a speed sensor or an acceleration sensor, and/or at least one GPS. Thereby sensor and/or GPS input may be provided such as to optimize the user's driving experience as well as the operation of the modular transport unit.

In a particular embodiment the at least one sensor element and/or at least one GPS is arranged on the housing of the propulsion module, for instance on an outer side of the housing of the propulsion module. Thereby it is ensured that the sensor element and/or GPS is always forming part of the modular transport unit, even after modification thereof by an end user.

In a particular embodiment the at least one sensor element and/or at least one GPS is controlled by the processor unit of the propulsion module.

In an embodiment the thrust system comprises a first thrust shaft being adapted and arranged to convert energy from the motor and transmitting converted energy to a second thrust shaft, the second thrust shaft being adapted and arranged to transmit energy from the first thrust shaft to the at least one propulsion element to enable propulsion of the modular transport unit. Thereby, a particularly simple, cheap and robust thrust system is provided for.

In an embodiment the modular transport unit further comprises at least one cargo floor and/or at least one undercarriage element arranged between the at least one cabin module and/or the at least one storage compartment module and the at least one propulsion module. Thereby a modular transport unit which is more versatile in terms of the types of goods transportable, which is more robust and which has a larger load capacity is provided for.

The at least one propulsion element may be any one of a sphere, a wheel, a propeller and a rotor.

In an embodiment the modular transport unit further comprises a plurality of propulsion modules and/or a plurality of cabin modules and/or a plurality of storage compartment modules. Thereby a modular transport unit with a particularly high degree of freedom in design being able to meet very versatile and variable demands for capacity, whether of load or of passengers, is provided for. Such an embodiment is therefore particularly suitable for forming a train, a tram or a lorry or road train, but also a bus.

In a second aspect of the invention, the above and other objects are achieved by means of a system for providing management and/or control of one or more modular transport unit(s) according to the first aspect of the invention, the system comprising:

a data processing device, such as a mobile telephone or a tablet computer or a laptop computer, and a computer readable medium, the data processing device being adapted for receiving input from sensor elements and/or indicators mounted on the propulsion module(s) of one or more modular transport unit(s) and/or from the processor unit of the propulsion module(s) one or more modular transport unit(s) and/or receive input from other sources such as internal databases of the one or more modular transport unit(s) or external databases or a user, and the computer readable medium comprising instructions configured for execution at the data processing device such as to cause the data processing device to use the received input to any one or more of:

servicing and managing real-time transport needs and accordingly model transport units based on autonomous calculations performed on the input, managing parameters related to usage, availability and/or condition of the one or more modular transport unit(s) in connection with e.g. subscription, share, purchase or lease of the one or more modular transport unit(s), calculating resource and/or fuel consumption of the one or more modular transport unit(s), calculating exploitation of resources in terms of passenger and/or goods capacity of the one or more modular transport unit(s), and displaying data to a user on a display of the system, preferably through a suitable app, such as a calendar or a spreadsheet, provided on the data processing device.

In a further embodiment of such a system, the computer readable medium comprises instructions configured for execution at the data processing device such as to cause the data processing device to enable the user to design and customize the modular transport unit, and especially the cabin and/or storage compartment module(S) thereof.

In a further embodiment of such a system, the computer readable medium comprises instructions configured for execution at the data processing device such as to cause the data processing device to communicate with and exchange data with a central server unit.

Thereby, a system is provided which enables management of one or more modular transport units by controls based on individualized ambient services.

Furthermore, such a system provides for development of a universal transport solution, meeting transport needs in real time for every occasion. Also, the system has the advantage of being supported by artificial intelligent software centralized by data collection and analysis, combined with application management.

With the present invention a concept for autonomously configuring transport units, operated and managed by individualized ambient app or equivalent, is thus provided for. Thus, individualized needs and autonomous exchangeable cabins and storage compartments, all managed by personalized ambient app, supported by a customized financial solution, is supported.

It is noted that in principle a modular transport unit according to the invention may be provided with any suitable number of propulsion modules, cabin modules and/or storage compartment modules. It is even possible, in some embodiments, that a cabin modules and a storage compartment module may be provided as one merged module, for instance in a manner resembling that of many modern, small cars developed for use in the city.

BRIEF DESCRIPTION OF THE DRAWINGS

The invention will be described in more detail below by means of a non-limiting example of a presently preferred embodiment and with reference to the schematic drawings, in which.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Referring first to FIGS. 1A, 1B, 1C and 2, a propulsion module 100 of a modular transport unit according to the invention will be described. It is noted that the propulsion module 100 is described herein as a circular well, i.e. having an overall shape of a cylinder with a circular cross section, but that it is not limited to this exemplary shape. The propulsion module of the modular transport unit according to the invention may have any overall shape suitable for a particular purpose or overall design of the modular transport unit. Other examples than circular include rectangular and quadratic as well as tapered shapes. Also, the propulsion module of the modular transport unit according to the invention may have any suitable dimensions in any suitable scalable size.

Figure 2:
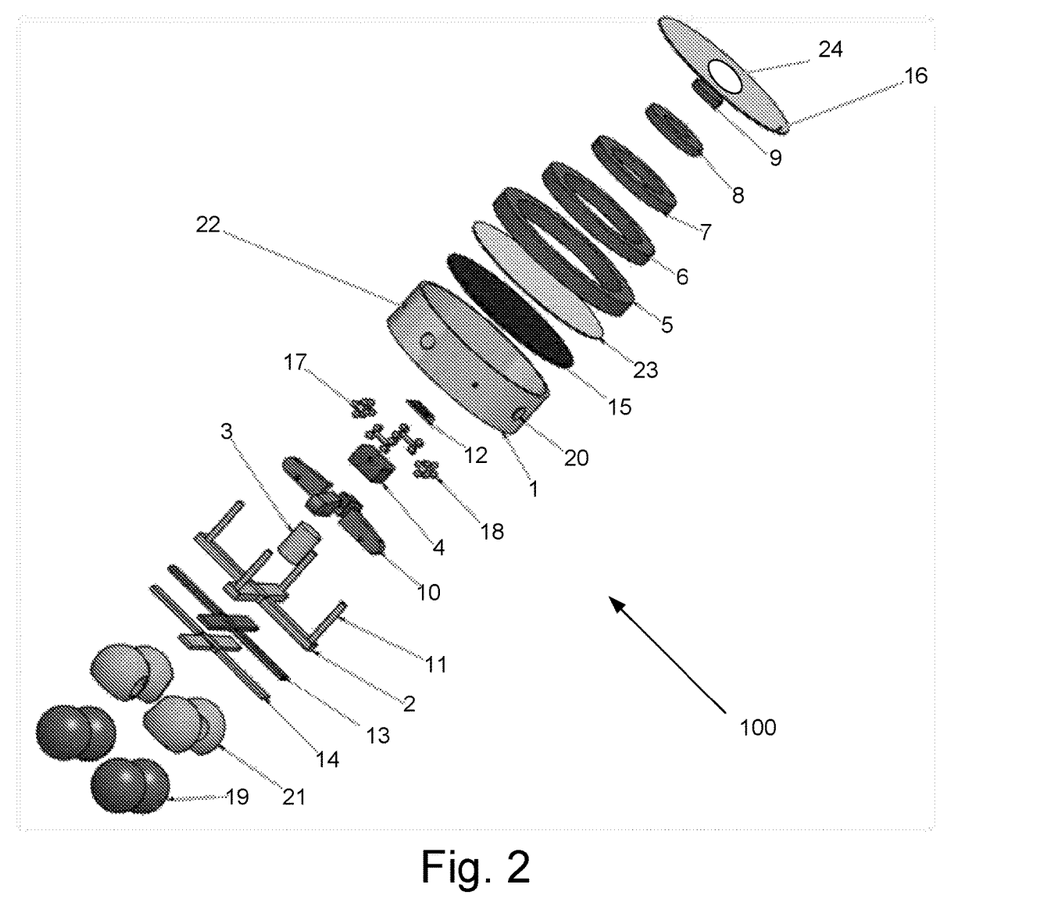
FIG. 2 shows an exploded perspective view of the propulsion module according to FIGS. 1A-1C.

With reference to FIG. 2 in particular, the propulsion module 100 comprises the following components:

A housing 1 having the purpose of covering and protecting the interior technology of the propulsion module 100, such as frame 2, frame posts 11, spheres 19, suspension 5, 6, 7, 8, 9, CPU 12, engine block 4, energy source compartment 15 with the energy source accommodated therein, thrust shafts 17, 18 and shafts 3, 10, brakes and so forth. The housing 1 also acts as a carriage for mounting of lights, cameras, sensors and the like. The housing is made of a suitable robust and weather resistant material, such as a metal or plastic, optionally provided with an anti-corrosive coating.

A frame 2 adapted for being connected to and carry and support frame posts 11, engine block 4, thrust shafts and shafts, brakes and the like. The frame 2 is furthermore adapted for protecting the interior of the propulsion module 100 from external loads by taking up such loads. The frame 2 is arranged in the housing 1.

A central shaft 3 adapted for functioning as a central assembling point. Thus, the central shaft 3 forms a connection between the frame 2 on the one side and components such as engine block 4, thrust shafts 17, 18 and shafts 3, 10 on the other side. The central shaft 3 is arranged in the housing 1.

An engine block 4 or motor adapted for converting energy form the energy source (not visible on the figures) in the energy compartment 15 to a propelling force. The engine block 4 controls speed and braking on all individual shafts 3, 10, 17, 18. The engine block 4 may be adapted for, but is not limited to, convert energy from energy sources such as batteries, solar, magnetic levitation, compressed air, biomass, gas, water, hydrogen, fuel rods. The engine block 4 may also be a hybrid engine block. The propulsion module 100 thus also comprises an energy source fitting with the type of engine block 4 chosen. The engine block 4 or motor is arranged in the housing 1. Providing the engine block 4 as part of a propulsion module 100 according to the invention provides for full flexibility in terms of direction and speed of travel in that with such a propulsion module 100, it is not of any importance which end of a cabin module or storage compartment module serves as the front end and rear end, respectively, of the modular transport unit.

A suspension unit 5, 6, 7, 8, 9, 13 is provided attached to the frame element 2. The suspension unit 5, 6, 7, 8, 9, 13 comprises a plurality of shock absorbing membranes 5, 6, 7, 8, 9 with mutually different diameters. The suspension unit 5, 6, 7, 8, 9, 13 may optionally further comprise a further shock absorbing membrane 13 arranged between the main part of frame element 2 and a bottom element 14 of the frame element 2. The shock absorbing membranes 5, 6, 7, 8, 9 are arranged on top of one another in decreasing order of diameter size or are alternatively nested within one another. The suspension unit 5, 6, 7, 8, 9, 13 is adapted not only to secure harmless and convenient transport of any item or person. The suspension unit 5, 6, 7, 8, 9, 13 is also supporting an individually autonomously controlled suspension ensuring the space necessary so that additional propulsion modules may be added beneath the cabin modules 200 and/or storage compartment modules 300 of the modular transport unit during transportation or when being parked. The suspension unit 5, 6, 7, 8, 9, 13 is arranged in the housing 1.

A first, individual shaft 10 adapted for controlling thrust and breaking of the propulsion module 100. The first individual shaft 10 is arranged in the housing 1. The first, individual shaft 10 is attached to the frame 2 via the central shaft 3 on one side and to the motor 4 via the transmission system 17, 18 described further below.

A frame post 11 forming part of the frame unit 2 is also provided. The frame post 11 is adapted for stabilization of the frame unit 2 and for protection of the interior of the propulsion module 100. The frame post 11 is adapted for supporting the top cover 16. The frame post 11 is arranged in the housing 1.

A central processing unit (CPU) 12 being configured for controlling the motor block 4 and optionally also for controlling the propelling element(s) 19 is also provided. The CPU 12 secures software based linking of the modular transport unit to other assigned modular transport units such as to enable traffic control, analyzes sensor input, GPS input, provides software protection, uplink to user management (ambient app, cf. FIG. 9), data collection, autonomous driving, traffic security, security measures and messages. Installed software comprising suitable instructions determines the functionality of CPU 12 controlling supportive transport units. Thus, all modular transport units of a plurality of modular transport units according to the present invention support coordinated movement, as well as coordinating communication with surroundings such as other vehicles and infrastructure. The CPU 12 may hold continuously updated roadmaps and weather forecasts, and may provide interaction with legal regulations on traffic. The CPU 12 may also provide an onboard autonomous parking application. Logging and live transmitting all data to a central administration and/or data warehouse and/or authorities may be supported by the CPU 12. The CPU 12 is arranged in the housing 1.

An optional further shock absorbing membrane 13 may form part of the suspension unit as described above. The further shock absorbing membrane 13 serves, in addition to the above-mentioned purposes, the additional purpose of absorbing shocks stemming from the propelling elements 19 (cf. further below) such as to protect the other components of the propulsion module 100 from such shocks.

An optional lower frame part 14 may be provided, especially in embodiments also comprising a further shock absorbing membrane 13. In such a case the further shock absorbing membrane 13 is arranged between the lower frame part 14 and the remaining frame 2. When a lower frame part 14 is present the propelling elements 19 and shields 21 are coupled to the lower frame part 14 and thereby to the frame 2. The further shock absorbing membrane 13 and the lower frame part 14 are arranged in the housing 1.

An energy source compartment 15 adapted for containing and protecting the energy source (not visible on the figures). As is also described above, the energy source may by way of example be an energy source such as batteries, solar cells, magnetic elements e.g. for providing magnetic levitation, compressed air, biomass, gas, water, hydrogen and fuel rods. The energy source compartment 15, and thus the energy source, is arranged in the housing 1.

An outer or top cover 16 is provided and may be a rotatable or a fixed top cover 16. The top cover 16 is adapted for mounting and carriage of cabin modules, storage compartment modules, and even odd objects directly. The outer or top cover 16 forms part of the housing 1.

To this end the top cover 16 comprises at least one connection element 24 adapted for connection with at least one complementary connection element 25 (cf. e.g. FIG. 3) provided on the at least one cabin module 200 and/or on the at least one storage compartment module 300 in such a way as to enable an end user to exchange the at least one cabin module 200 and/or the at least one storage compartment module 300 according to need and desire.

The at least one connection element 24 and the at least one complementary connection element 25 may for instance be complementary safety locks, or complementary magnetic or electric latches controlled by manual or autonomous determined action, e.g. by means of an app to be described further below.

An inner cover 23 forming a cover on the energy source compartment 15 may optionally also be provided.

Furthermore a transmission system 17, 18 is provided and configured or adapted to convert energy/thrust/breaking from the motor block 4 and transmit the converted energy/thrust/breaking to the propelling elements 19 to enable propulsion of the modular transport unit. The transmission system 17, 18 is arranged in the housing 1.

In the embodiment shown, the transmission system 17, 18 comprises a first thrust shaft 17 being a rotatable shaft power unit controlled by CPU 12 to convert energy/thrust/breaking and transmit the converted energy/thrust/breaking to a second thrust shaft 18.

The transmission system 17, 18 further comprises a second thrust shaft 18 being a rotating shaft power unit with e.g. a twin roller controlled by CPU 12 and transmitting the converted energy/thrust/breaking to the propelling elements. The first and second thrust shafts 17, 18 are arranged in the housing 1.

Propelling elements 19, which in the embodiment shown are provided as spheres, are provided. The propelling elements 19 are run by the second thrust shaft 18. The propelling elements 19 contact a driving surface and provides movement of the modular transport unit in all directions. The propelling elements 19 are coupled to the frame 2, or the lower frame part 14 where provided, by means of bearings (not visible on the figures as they are arranged in the shields 21), in such a way that the propelling elements 19 are freely rotatable, i.e. are rotatable in all directions or about a plurality of rotation axes. The propelling elements 19 are thus coupled to the frame element 2 at a side opposite to the shock absorbing membranes 5, 6, 7, 8, 9. The bearings are in one embodiment ball bearings. Particularly, in one embodiment the propelling elements 19 are spheres and are coupled to the shields 21 and thus to the frame by means of balls being smaller than the propelling elements 19 and acting as bearings, such that the shields 21 and the smaller balls together hold the propelling elements 19. Irrespective of the embodiment, the bearings hold the propelling elements 19 in such a way that the propelling elements 19 and the shields 21 are arranged close to one another but are not in contact. In alternative embodiments the propelling elements may be wheels, propellers, rotors or elements configured to enable propulsion by levitation.

Lights, e.g. head lights and tail lights as are required by law on vehicles, and sensor indicators 20 may be provided. The lights and sensor indicators 20 are mounted on the housing 1.

Shields 21 are optionally arranged between the propulsion element and the bearing. When shields 21 are provided, the bearings carrying the propelling elements are arranged in the shield element, and are hence not visible on FIG. 2. The shield elements 21 thus shield the propulsion element and the bearing. The shield elements 21 are attached to the frame element 2 at a side opposite to the shock absorbing membranes 5, 6, 7, 8, 9.

Finally, sensors 22 may be provided and are mounted on the housing 1. The sensors may be any suitable type of sensors, such as speed sensors, acceleration sensor, vibration sensors, sound sensors and light sensors. In addition elements 22 may in some embodiments also denote elements such as a GPS, a radar, a camera, an antenna or a gyroscope.

Figures 1A, 1B, 1C:
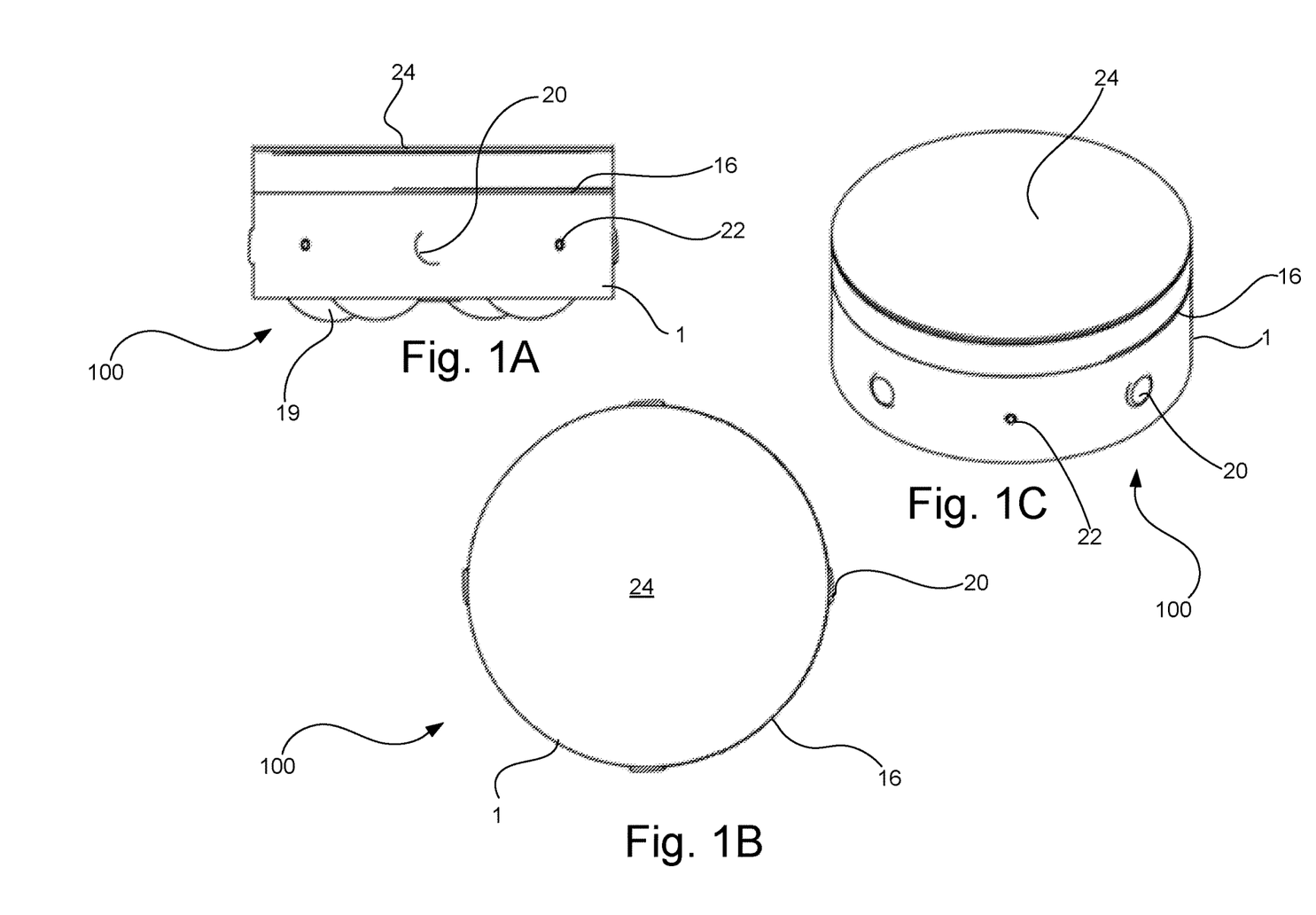
FIGS. 1A-1C shows a side view, a top view and a perspective view, respectively, of an assembled propulsion module.

Thus, FIGS. 1 and 2 show an example on a propulsion module 100 which serves as undercarriage and for propelling the modular transport unit simultaneously, and thus supports any need of transportation. Preinstalled Wi-Fi or cabled linking and communication may be provided to securing autonomous scalable undercarriage functionality by adjusting the number of modules to support the relevant need for transportation. Adaptation on a community smart grid may also be provided for.

FIGS. 3-8 show different embodiments of a modular transport unit according to the invention.

Figure 3:
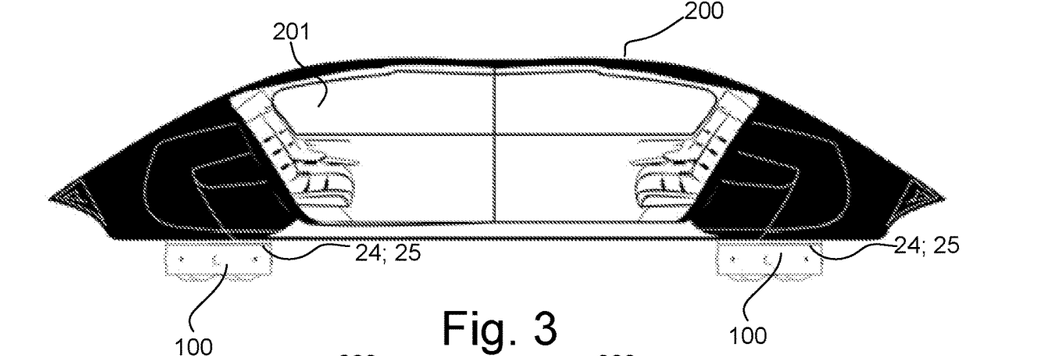
FIG. 3 shows a side view of a first embodiment of a modular transport unit according to the invention and comprising two propulsion modules and a cabin module, the cabin module being capable of holding 4 passengers, and the interior design being scalable for extra passengers and/or cargo.

FIG. 3 shows a side view of a first embodiment of a modular transport unit according to the invention. The modular transport unit of FIG. 3 may be a car requiring a driver to operate it or it may be an autonomously driving car, i.e. a driver-less car. The modular transport unit comprises two propulsion modules 100 and a cabin module 200. The cabin module 200 is in the embodiment shown provided with four seats 201 and is thus capable of holding four passengers, but may in other embodiments be provided with another number of seats 201 and thus be able to hold another number of passengers such as 2, 5 or 6. Thus, and irrespective of the embodiment, the interior design of the cabin module 200 is scalable for extra passengers and/or cargo.

Figure 4:
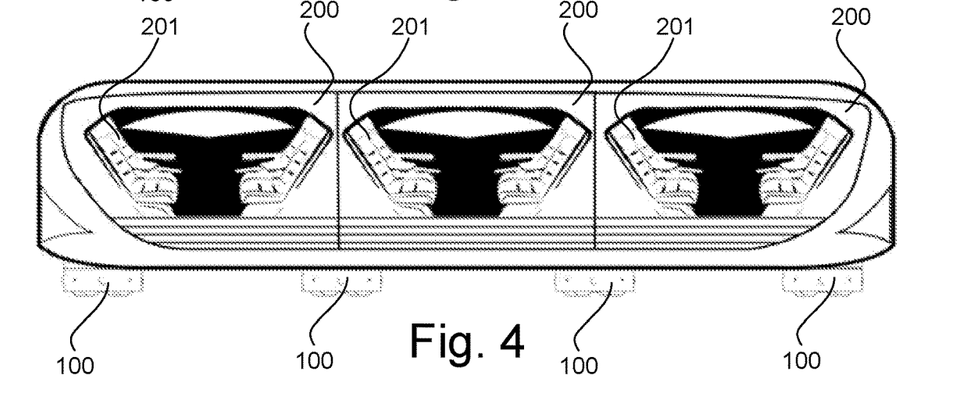
FIG. 4 shows a side view of a second embodiment of a modular transport unit according to the invention and comprising four propulsion modules and three cabin modules, each cabin module being capable of holding 4 passengers, and the interior design of each cabin module being scalable for extra passengers and/or cargo.

FIG. 4 shows a side view of a second embodiment of a modular transport unit according to the invention. The modular transport unit of FIG. 4 may be e.g. a bus or a mini-bus requiring a driver to operate it or it may be an autonomously driving, i.e. a driver-less, bus or mini-bus. Alternatively, the modular transport unit of FIG. 4 may be used as a train wagon or a tram car or a metro or underground car or a light rail car. The modular transport unit therefore comprises four propulsion modules 100 and three cabin modules 200. Each cabin module comprises four seats 201 and is capable of holding four passengers. It is possible to adapt the number of propulsion modules 100 and/or cabin modules 200 according to the number of passengers expected, for instance to accommodate both requirements within and outside rush hours. Generally, but in particular in embodiments as that shown in FIG. 4, the automotive propulsion modules 100 according to the invention, may be used to relieve and/or assist a modular transport unit while in motion. For instance, a modular transport unit according to FIG. 4 may start a journey and may at a certain point be split up into two or more modular transport units continuing the journey in separate directions. Such an embodiment is especially suitable when the modular transport unit is a train, a tram or a road train carrying passengers or goods intended for different destinations.

Figure 5:
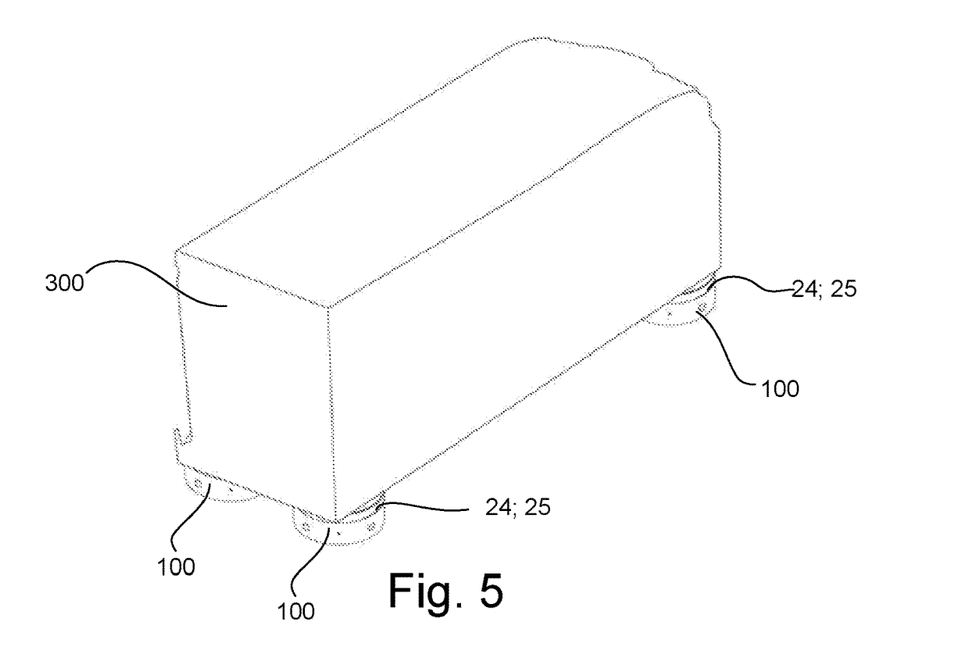
FIG. 5 shows a perspective view of a third embodiment of a modular transport unit according to the invention and comprising four propulsion modules (one not being visible) and a van or truck type storage compartment module.

FIG. 5 shows a perspective view of a third embodiment of a modular transport unit according to the invention. The modular transport unit of FIG. 5 may be a van or a truck requiring a driver to operate it or it may be an autonomously driving, i.e. a driver-less, van or truck. Thus, the modular transport unit in this embodiment comprises four propulsion modules 100 (one not being visible) and a van or truck type storage compartment module 300. Although not visible on FIG. 5 a front end of the storage compartment module 300 may be adapted for functioning as a cabin module 200, or it may simply be substituted for a cabin module 200, for accommodating the truck or van driver.

Figure 6A:
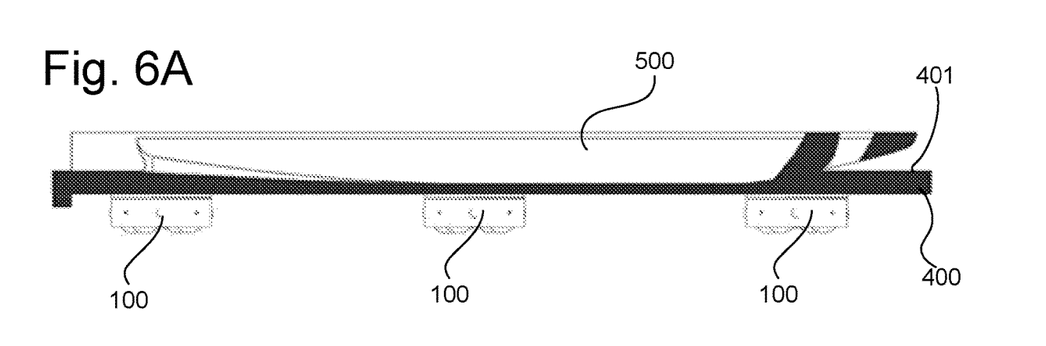
FIGS. 6A and 6B show a side view and a perspective view, respectively, of a fourth embodiment of a modular transport unit according to the invention and comprising six propulsion modules and a storage compartment module of the open trailer type with an optional cargo floor for transporting odd sized goods or objects.
Figure 6B:
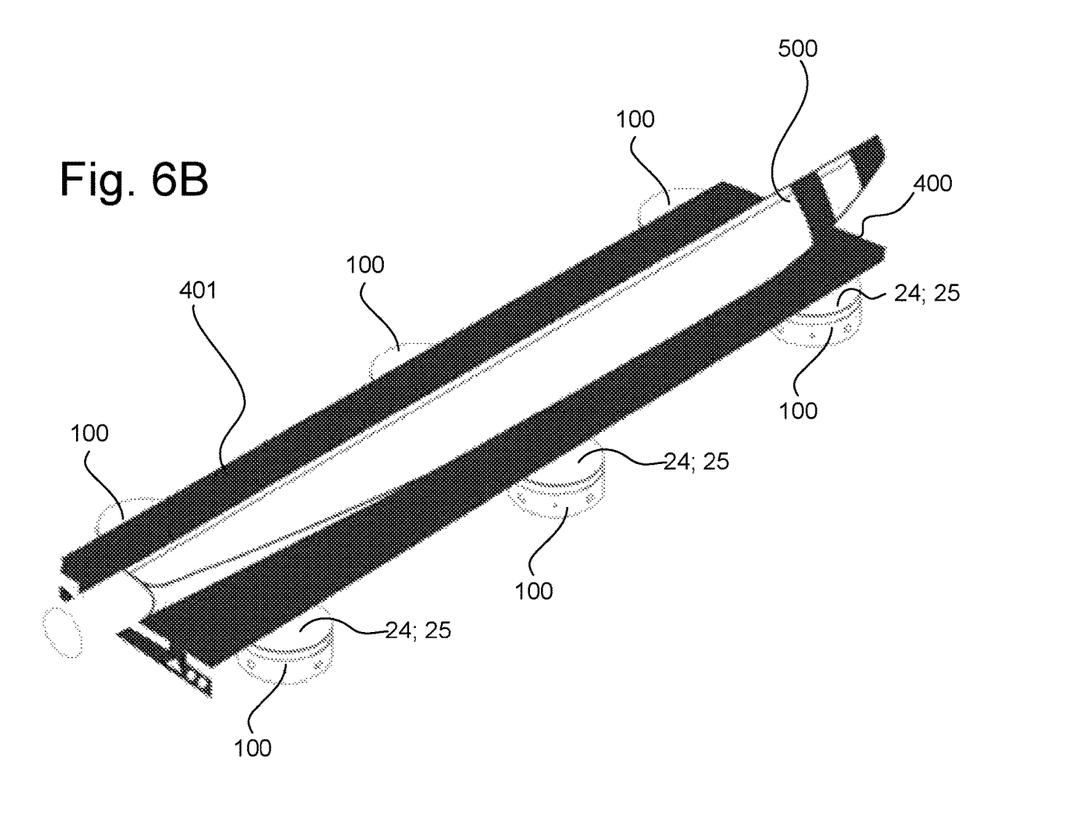

FIGS. 6A and 6B show a side view and a perspective view, respectively, of a fourth embodiment of a modular transport unit according to the invention. The modular transport unit of FIG. 6 may be a trailer requiring to be coupled to and town by a car, van, truck or the like it, e.g. a modular transport unit according to any of FIGS. 3-5, or it may be an autonomously driving trailer type transport unit. The modular transport unit shown comprises six propulsion modules 100 and a storage compartment module 400 of the open trailer type with an optional cargo floor 401 for transporting odd sized goods or objects 500. In some embodiments an end of the storage compartment module 400 may also be provided with a cabin module 200 for a driver.

Figure 7:
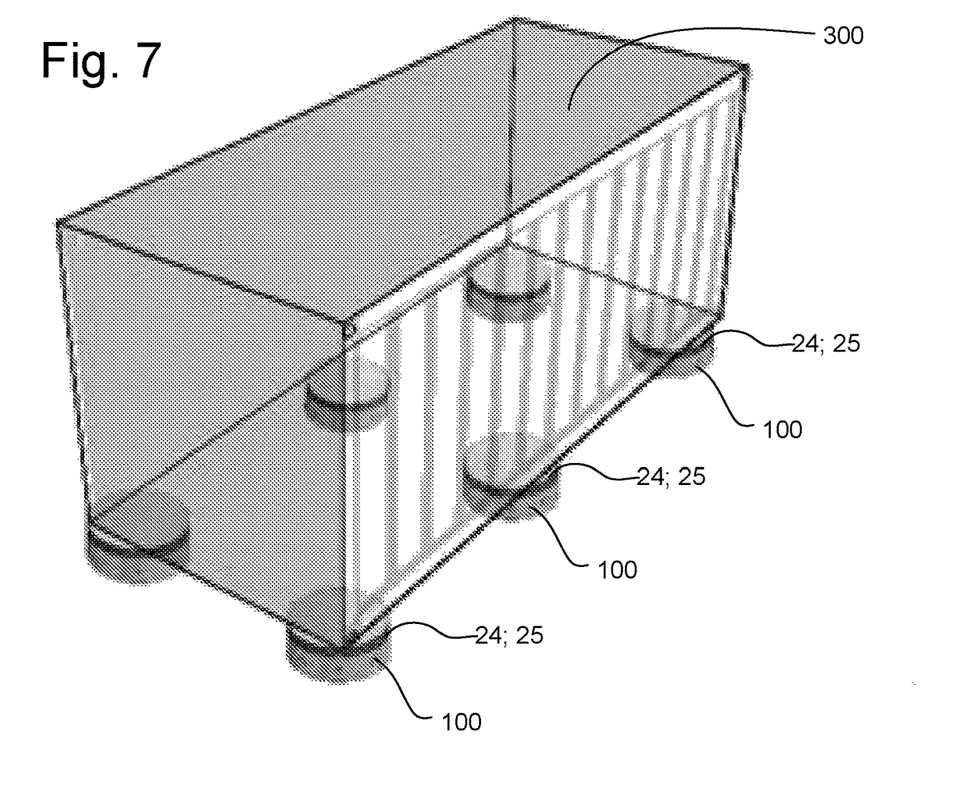
FIG. 7 shows a perspective view of a fifth embodiment of a modular transport unit according to the invention and comprising six propulsion modules and a storage compartment module of the container-type.

FIG. 7 shows a perspective view of a fifth embodiment of a modular transport unit according to the invention. The modular transport unit of FIG. 7 comprises six propulsion modules 100 and a storage compartment module 300 of the container-type.

Figure 8A:
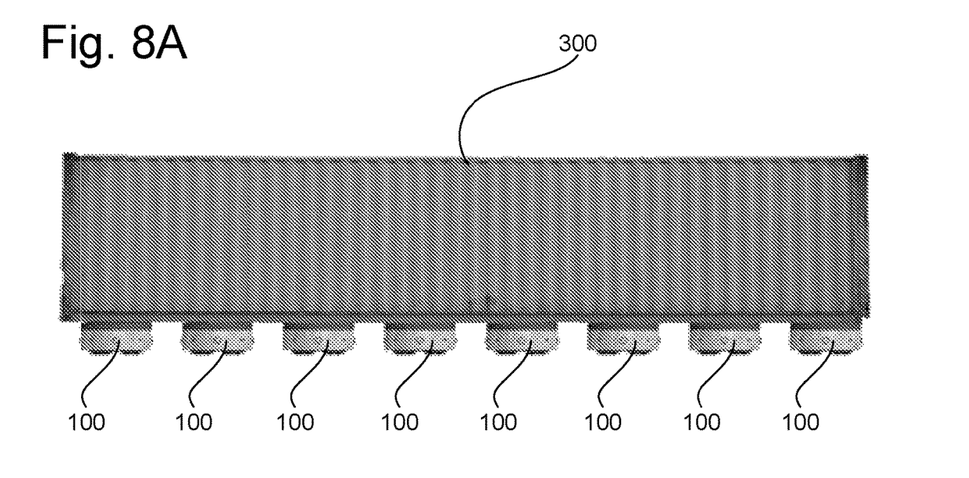
FIGS. 8A and 8B shows a side view and a top view, respectively, of the modular transport unit according to FIG. 7, but customized to comprise sixteen propulsion modules and a larger storage compartment module of the container-type.
Figure 8B:
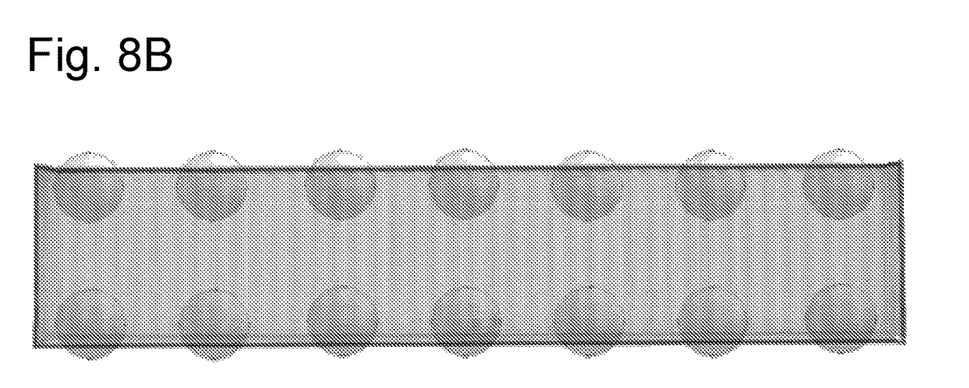

FIGS. 8A and 8B shows a side view and a top view, respectively, of the modular transport unit according to FIG. 7, but customized to comprise sixteen propulsion modules 100 and a larger storage compartment module 300 of the container-type.

Thus, modular transport units such as the modular transport units according to FIGS. 7, 8A and 8B provide for the transport of containers of any size and weight.

Irrespective of the embodiment of a modular transport unit according to the present invention, autonomous replacement of all existing cabin modules and/or storage compartment modules may be carried out, autonomous adaptation of self-made and/or self-produced cabin modules and/or storage compartment modules, e.g. 3D printing of cabin modules and/or storage compartment modules and/or cabin module or storage compartment module spare parts may be carried out by the end user. Also, all sorts of objects, including odd objects, may be autonomously transported.

Figure 9:
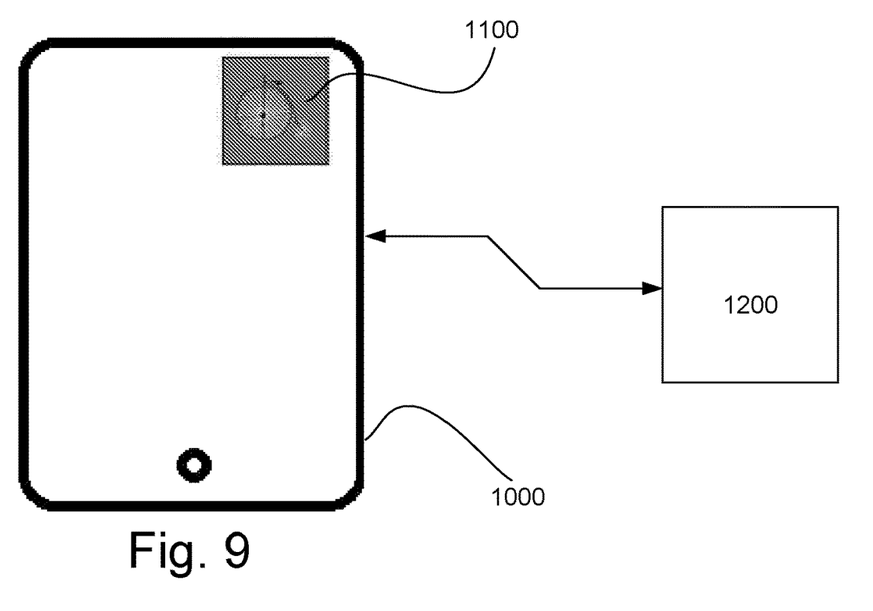
FIG. 9 schematically illustrates a system according to the second aspect of the invention in the form of a data processing device with an app-solution installed thereon for providing full management of TAAS for private households or businesses.

Finally, turning to FIG. 9, an app-solution for providing full management of TAAS for private households or businesses is illustrated schematically. An app 1100 is provided on a data processing device 1000 such as a mobile telephone or a tablet computer or a laptop computer.

The app 1100 is programmed to, and thus comprises instructions executable on the data processing device 1000 to, providing full management of TAAS for private households or businesses.

To this end the app 1100 may receive input from the sensor elements and indicators 20 mounted on the propulsion module 100 and/or from the CPU 12 mounted in the propulsion module 100. Input from the CPU 12 may comprise any one or more of weather forecasts and data logged and live transmitted to the app 1100. The app 1100 may also receive input from other sources such as internal or external databases or a user.

The app 1100 may comprise instructions executable on the data processing device 1000 to service and manage real-time transport needs and accordingly model transport units based on autonomous calculations of for instance distance to a destination, distance covered, load of carriage (number of transport units), weight of carriage, calendar interaction and deadlines, transport distances and purposes also calculated based on photography of the items which needs transportation.

The app 1100 may comprise instructions executable on the data processing device 1000 to collect and analyze data and/or to provide information as an autonomous resource on private household or professional calendars. Thereby service on availability is improved.

The app 1100 may comprise instructions executable on the data processing device 1000 to manage financing on usage as well as availability, condition and so forth of one or more modular transport units according to the invention by e.g. subscription, share, purchase or lease.

The app 1100 may comprise instructions executable on the data processing device 1000 to provide environmental and resource optimization, for instance by providing information on how to optimize the energy or fuel consumption, or in case of a driver-less embodiment autonomously optimizing the energy or fuel consumption.

The app 1100 may also comprise instructions executable on the data processing device 1000 to optimize exploitation of resources in terms of passenger and/or goods capacity. Thereby, overcapacity in transport facilities (e.g. reducing parked vehicles) may be avoided and costs consequently lowered.

The app 1100 may comprise instructions executable on the data processing device 1000 to display data to the user, e.g. on a screen or display of the data processing device 1000.

The app 1100 may also comprise instructions executable on the data processing device 1000 such as to cause the data processing device 1000 to communicate with and exchange data with a central server unit 1200. In this case, an external or central database and/or an external or central control or management of the modular transport unit(s) on or by means of the central server unit 1200 is enabled. Also, the CPU 12 may be configured to transmit or live transmit data logged directly to the central server unit 1200. The central server unit 1200 may be a central server unit of a central administration and/or data warehouse and/or an authority, e.g. a tax authority such as to enable simple and straight forward computation of applicable taxes in real time, thus simplifying the tax system significantly. Also, the CPU 12 may be configured to receive data, such as updated weather forecasts, traffic information and road maps for the app 1100 and/or the central server unit 1200.

The app 1100 and/or the central sever unit 1200 may also comprise instructions in the form of intelligent software executable on a processor unit, e.g. on the data processing device 1000, such as to analyze the data received from the modular transport unit(s) and based on the analysis gain knowledge of the transportation needs associated with the modular transport unit(s) and their use.

The person skilled in the art realizes that the present invention by no means is limited to the preferred embodiments described above. On the contrary, many modifications and variations are possible within the scope of the appended claims.

The invention claimed is:

1. A modular transport unit adapted for transporting persons and/or goods, the modular transport unit comprising:
   at least one cabin module adapted for accommodating and transporting persons; and/or
   at least one storage compartment module adapted for accommodating and transporting goods; and
   at least one autonomous propulsion module that comprises:
      a frame element;
      a suspension unit being attached to the frame element and comprising a plurality of shock absorbing membranes with mutually different diameters, the shock absorbing membranes being arranged on top of one another or nested within one another;
      at least one propulsion element;
      at least one bearing, the at least one propulsion element being coupled to the at least one bearing in such a way that the at least one propulsion element is free to rotate about at least one axis of rotation, and the at least one bearing being attached to the frame element at a side opposite to the suspension unit;
      a motor and an energy source for delivering energy to the motor;
      a thrust system being adapted and arranged to convert energy from the motor and transmitting converted energy to the at least one propulsion element to enable propulsion of the modular transport unit; and
      a housing comprising a top cover element comprising at least one connection element adapted for connection with at least one complementary connection element provided on the at least one cabin module and/or at least one complementary connection element provided on the at least one storage compartment module in such a way as to enable an end user to connect and/or disconnect the at least one cabin module and/or the at least one storage compartment module to/from the at least one autonomous propulsion module,
   such that the at least one autonomous propulsion module is adapted for simultaneously serving as a flexible, customizable undercarriage of the modular transport unit and, in operation, propelling the modular transport unit, and
   wherein the modular transport unit is any one of a car, a van, a truck, a bus, a train, a train wagon, a tram, or a tram car.

2. The modular transport unit according to claim 1, wherein the at least one connection element and the at least one complementary connection element are one or more of safety locks, magnetic latches, and electrical latches, and wherein the at least one connection element and the at least one complementary connection element are controlled by manual or autonomous action.

3. The modular transport unit according to claim 1, wherein the thrust system comprises a first thrust shaft and a second thrust shaft, and wherein the propulsion module further comprises one or more of:
   a brake unit adapted for reducing the propulsion speed;
   a processor unit configured to control one or more of the motor, the energy source, the first thrust shaft, the second thrust shaft, the brake unit, or the propulsion elements;
   at least one shield element, the propulsion element and the bearing being arranged in the at least one shield element, and the at least one shield element being attached to the frame element at a side opposite to the suspension unit;
   a further shock absorbing membrane and a lower frame part forming part of the frame element, the further shock absorbing membrane being arranged between the lower frame part and the remaining frame element; or
   a compartment adapted for accommodating the energy source, the compartment comprising a cover element.

4. A system for providing management and/or control of one or more modular transport unit(s) according to claim 3, the system comprising:
   a data processing device and a computer readable medium, the data processing device being adapted for receiving input from sensor elements and/or indicators mounted on the propulsion module(s) of one or more modular transport unit(s) and/or from the processor unit of the propulsion module(s) of one or more modular transport unit(s) and/or receive input from other sources such as internal databases of the one or more modular transport unit(s) or external databases or a user; and
   the computer readable medium comprising instructions configured for execution at the data processing device to cause the data processing device to use the received input to any one or more of:

servicing and managing real-time transport needs and accordingly model transport units based on autonomous calculations performed on the received input;

managing parameters related to usage, availability and/or condition of the one or more modular transport unit(s) in connection with subscription, share, purchase, or lease of the one or more modular transport unit(s);

calculating resource and/or fuel consumption of the one or more modular transport unit(s);

calculating exploitation of resources in terms of passenger and/or goods capacity of the one or more modular transport unit(s) and displaying data to a user on a display of the system.

5. The system according to claim 4, wherein the data processing device is a mobile telephone, a tablet computer, or a laptop computer.

6. The system according to claim 4, wherein data is displayed to a user through an app, a calendar, or a spreadsheet provided on the data processing device.

7. The modular transport unit according to claim 1, further comprising at least one sensor element.

8. The modular transport unit according to claim 7, wherein the at least one sensor element is any one of a radar, a camera, a gyroscope, an antenna, a laser-based sensor element, a speed sensor, or an acceleration sensor, and wherein the modular transport unit further comprises at least one global positioning system (GPS) sensor.

9. The modular transport unit according to claim 7, wherein the at least one sensor element is arranged on the cover element.

10. The modular transport unit according to claim 9, wherein the at least one sensor element is arranged on an outer side of the cover element.

11. The modular transport unit according to claim 7, wherein the at least one sensor element is controlled by a processor unit.

12. The modular transport unit according to claim 1, wherein the thrust system comprises a first thrust shaft being adapted and arranged to convert energy from the motor and transmitting converted energy to a second thrust shaft, the second thrust shaft being adapted and arranged to transmit energy from the first thrust shaft to the at least one propulsion element to enable propulsion of the modular transport unit.

13. The modular transport unit according to claim 1, and further comprising at least one cargo floor and/or at least one undercarriage element arranged between the at least one cabin module and/or the at least one storage compartment module and the at least one propulsion module.

14. The modular transport unit according to claim 1, wherein the at least one propulsion element is a sphere, a wheel, a propeller, or a rotor.

15. The modular transport unit according to claim 1, further comprising one or more of a plurality of propulsion modules, a plurality of cabin modules, or a plurality of storage compartment modules.

16. The modular transport unit according to claim 1, wherein the at least one bearing is a ball bearing.

17. The modular transport unit according to claim 1, wherein the at least one propulsion element is coupled to the at least one bearing in such a way that the at least one propulsion element is free to rotate about a plurality of axes of rotation.

* * * * *